Nov. 29, 1955  M. E. BROWN  2,725,120
COMPENSATING DEVICE FOR SPRING MOTOR
Filed May 11, 1953  2 Sheets-Sheet 1

Morris E. Brown
INVENTOR.

BY

ATTORNEY & AGENT

Nov. 29, 1955  M. E. BROWN  2,725,120
COMPENSATING DEVICE FOR SPRING MOTOR
Filed May 11, 1953  2 Sheets-Sheet 2

Morris E. Brown
INVENTOR.

BY

ATTORNEY & AGENT

United States Patent Office 2,725,120
Patented Nov. 29, 1955

2,725,120

COMPENSATING DEVICE FOR SPRING MOTOR

Morris E. Brown, Rochester, N. Y., assignor to Eastman Kodak Company, Rochester, N. Y., a corporation of New Jersey Application May 11, 1953, Serial No. 354,345

5 Claims. (Cl. 185—37)

The invention relates to a compensating device for spring motor powered mechanisms and more particularly to a compensating device which will automatically increase the speed setting of a speed responsive mechanism so as to cancel out the speed variation due to the change in motor torque as the spring motor runs down.

In the application of spring motors to photographic apparatus such as movie cameras, it has been conventional practice to utilize a spiral type spring motor for driving the film advancing mechanism and take-up reel. The running time of such a motor is relatively short and, as a result, it is necessary to rewind the motor after a relatively short length of film has been exposed in order to insure that the film is advanced at the required speed. It has been found that springs having non-cumulative force characteristics and which exert a predetermined force provide a much longer running time and because such a spring remains tightly wound on its shaft, it is possible to compensate for the variation in torque as the spring convolutions decrease in diameter.

In the present invention an operating lever is maintained in engagement with the outermost convolution of the spring on the drive shaft and is connected to a brake member which is movable relative to a friction member forming a part of the governor. The governor is driven from the drive shaft and the speed at which the drive shaft is driven is dependent on the relation of the brake member to the friction member of the governor. A cam which is manually rotated moves the brake member axially to any one of several positions to establish the different speeds of the governor. As the operating lever moves toward the drive shaft, upon reduction in diameter and number of convolutions, the brake member is rotated about its point of contact with the cam and has imparted thereto a small component of axial movement which is in a direction which would permit an increase in the speed of the governor. By proper selection of the pivot point of the operating lever, the change in position of the brake member, which is made independently of the cam, compensates for the speed drop normally experienced as the spring motor runs down. The resulting drop in torque is due to the reduction in radius at which the force is applied in spring motors of the type having the above-mentioned characteristics.

The primary object of the invention is, therefore, to provide a compensating device for spring motors in which the speed drop normally experienced with such motors is eliminated by cancelling out the speed variation due to the change in motor torque as the spring motor runs down.

Another object of the invention is to provide a compensating device for spring motors in which a speed responsive means driven by the motor is varied in speed independently of its setting to a predetermined speed in accordance with the decreasing diameter of the spring convolutions on the drive shaft.

And still another object of the invention is to provide a compensating device for spring motors in which a lever movable by the decrease in diameter of the spring convolutions varies the relation of a brake member with respect to the friction member of a governor in a direction to increase the speed of the governor so as to cancel out the speed variation due to the change in motor torque as the spring motor runs down.

These and other objects and advantages will be apparent to those skilled in the art by the description which follows.

Reference is now made to the accompanying drawings wherein like reference numerals designate like parts and wherein.

A preferred embodiment of the invention is disclosed in conjunction with a motion picture camera in which a spring motor is utilized to drive the film advancing mechanism and take-up reel. Such cameras usually include a governor which controls the effective torque of the spring motor so as to maintain a constant speed. However, as is well-known, the torque derived from a conventional spiral power spring is not uniform over a long running period. In order to increase the running time of motion picture cameras, it has been found that a spring having non-cumulative force characteristics and exerting a predetermined force will increase the running time several fold. Springs of this type are manufactured by the Hunter Spring Company under the trade name "Neg'ator."

Figure 1:
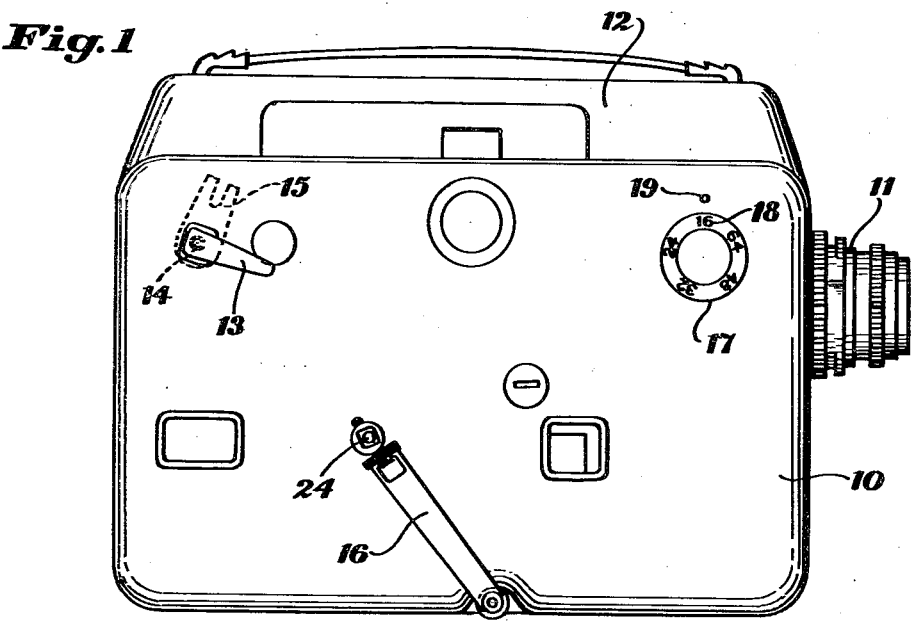
Fig. 1 is a side elevation of a motion picture camera embodying the invention.

The camera disclosed in Fig. 1 comprises a casing 10 having a lens 11 on the front wall thereof and a finder 12 on the top wall. Release arm 13 is connected to shaft 14 which carries internal of the casing the bifurcated arm 15. A conventional winding handle 16 is utilized to wind the spring motor. A rotatable knob 17 carries a frame speed scale 18 which is moved with respect to index 19 to indicate the number of film frames that are to be exposed per second and sets the speed of the drive in accordance with the selected speed as described hereinafter.

Figure 3:
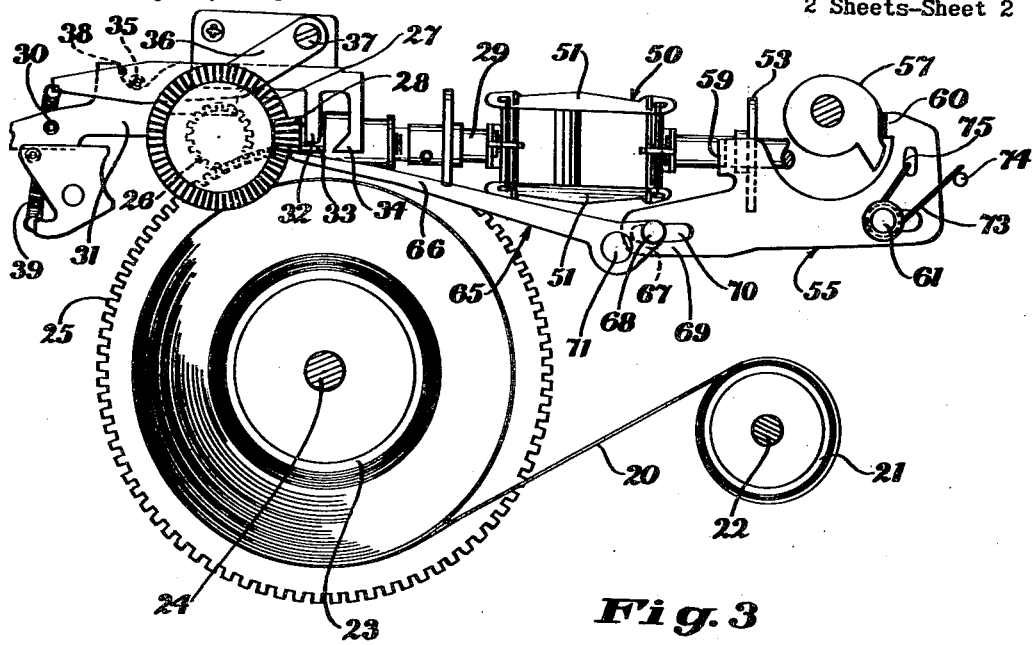
Fig. 3 is an elevation view of the speed responsive means and the compensating mechanism and showing the spring motor in its fully wound condition.
Figure 4:
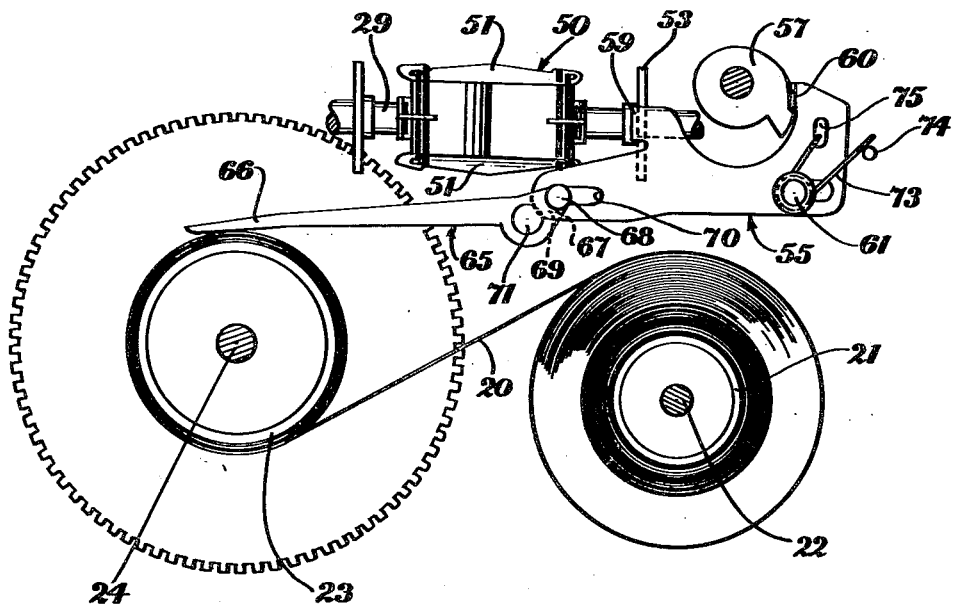
Fig. 4 is an elevation view similar to Fig. 3 and showing the spring motor in an unwound condition.

With reference to Figs. 3 and 4, spring 20 is of the type having non-cumulative force characteristics and capable of exerting a predetermined force. Briefly, the spring is a tight coil of flat material which is progressively unwound throughout the range of action. The material is prestressed in manufacture so that it possesses a strong natural curvature and force must be exerted to straighten it. Throughout its entire length the spring is so highly prestressed that when it forms a natural coil, the turns lie tightly upon each other and the resultant coil is solid.

Spring 20 has one end thereof coiled or secured to take-up drum 21 which is freely rotatable on shaft 22 and the other end secured to power drum 23 fixed to drive shaft 24 and on which the spring is wound by handle 16 connected to shaft 24 for winding purposes. The drive shaft 24 is connected to gear 25 by means of a spring-type overrunning clutch, not shown, which permits the drive shaft to rotate in one direction to drive gear 25 and to be rotated in the other direction for winding spring 20 onto drum 23. Gear 25 meshes with pinion 26 integral with bevel gear 27 which, in turn, meshes with gear 28 fixed to governor shaft 29.

The bifurcated arm 15 connected to release arm 13 engages pin 30 on plate 31 which is slidably mounted for movement to the right to disengage extension 32 from stop member 33 to permit continuous rotation of governor shaft 29 until returned to its normal position in the path of member 33 and for movement to the left to disengage extension 32 from stop member 33 and position extension 34 in the path of member 33 so that only a single exposure or revolution of shaft 29 is made. From Fig. 3 it will be noted that extensions 32 and 34 are shaped to permit the instant release of stop member 33 when moved to the left and on return of plate 31 to its normal position extension 32 enters the path of stop member 33 before extension 34 leaves the path, thereby insuring only one revolution of shaft 27. Roller 35 on link 36 pivoted at 37 engages a cam notch 38 in plate 31, the roller and cam notch together with spring 39 serving to return plate 31 to its normal position. Cam notch 38 limits movement of plate 31 to the left and permits roller 35 to ride out of the notch on movement to the right for continuous operation provided arm 15 is rotated to the limit of its movement and in which case arm 15 must be moved to return roller 35 to notch 38 to permit return of plate 31 to its normal position by means of link 36 and spring 39.

The speed responsive means comprises a governor 50 having weights 51 arranged to be moved outwardly by centrifugal force against the action of spring 52 as shaft 29 is rotated and returnable to their normal position by said spring. Movable with the weights is a friction member 53 which is moved axially of shaft 29 in accordance with the speed of the shaft, as is well-known. Shaft 29 at its end 54 is connected to the film advancing mechanism in any suitable manner.

Figure 2:
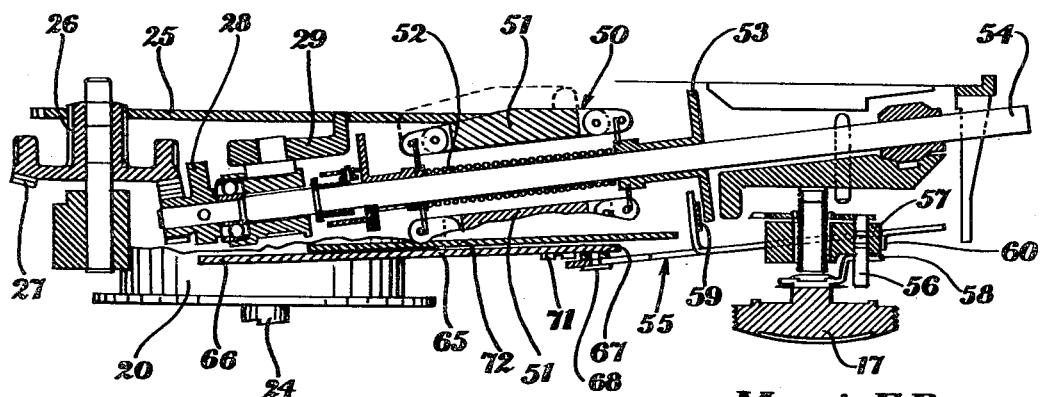
Fig. 2 is a sectional view taken through the speed responsive mechanism and showing the elements comprising the compensating mechanism in relation thereto.

In order to control the rotation of shaft 29 in accordance with any one of the predetermined frame per second speeds indicated on knob 17, a control member 55 is provided and is operatively connected to knob 17 by means of pin 56 carried by the actuating member or cam 57 and bifurcated lever 58, as shown in Fig. 2. Control member 55 comprises a braking member 59 and a follower 60 which engages cam 57 and is mounted at 61 to a suitable surface in such a manner as to permit axial movement thereof with respect to governor 50 and friction member 53 and pivotal movement about the point of engagement of cam 57 and follower 60. As will be apparent from Figs. 3 and 4, rotation of knob 17 to position any one of the frame speeds 18 opposite index 19 will also rotate cam 57 by means of pin 56 and lever 58. As cam 57 is rotated, control member 55 is moved axially and braking member 59 is positioned with respect to friction member 53 to establish one of the predetermined speeds.

The operating means comprises a lever 65 having an end 66 in engagement with the outermost convolution of spring 20 on power drum 23 and the other end 67 pivotally and slidably connected at 68 to end 69 of control member 55 by means of slot 70. Lever 65 is pivotally mounted at 71 on plate 72. Torsion spring 73 encircles the mounting point 61 of control member 55 and has one end engaging pin 74 and the other end engaging slot 75 in member 55. From Figs. 3 and 4 it will be noted that spring 73 exerts a force on control member 55 between the mounting point 61 and the point of engagement of cam 57 and follower 60 and tends to rotate control member 55 about the cam in a clockwise direction. As a result, control member 55 maintains end 66 of lever 65 against the outer convolution of spring 20 due to the relation between pivotal point 61 and the connection between the members at 68.

In operation, end 66 of lever 65 moves from the position shown in Fig. 3 to that shown in Fig. 4 when the drive is released by plate 31. As the motor runs down, spring 20 is rewound onto take-up drum 21 due to its inherent qualities thereby imparting rotation to power drum 23 and through the clutch and gear drive to shaft 29. With the movement of lever 65, control member 55 is pivoted or rotated in a clockwise direction about the point of engagement of cam 57 and follower 60 which imparts a motion to braking member 59 independently of cam 57, a small component of which is in a direction tending to permit the speed of the governor 50 to increase. By varying the distance between pivotal point 71 and the connection at 68, various speed drops may be compensated for as the motor runs down. With a spring motor of the type described, the drop in torque is due to the reduction in radius at which the force is applied and is compensated for by the device described.

While the compensating device has been described with reference to the preferred embodiment in which a plurality of frame per second speeds are utilized, it is to be understood that such a device is also capable of being used in instances where only a single speed is used. Accordingly, the word "plurality" may designate one, as well as more than one.

Since other modifications and applications of the invention will be suggested and apparent to those skilled in the art, the scope of the invention is defined in the appended claims.

Having now particularly described my invention, what I desire to secure by Letters Patent of the United States and what I claim is:

1. A speed control assembly for operation at a plurality of predetermined speeds comprising a speed responsive means having a plurality of weight members movable by centrifugal forces created therein, a friction member movable by said weight members to several positions each corresponding to a different predetermined speed of said speed responsive means, a drive means including a resilient metallic band having the ends thereof fixed to spaced parallel shafts and adapted to be wound in a spiral from one of said shafts onto the other of said shafts, said other shaft being a drive shaft operatively connected to and driving said speed responsive means when said band is wound from said drive shaft onto said first-mentioned shaft, control means including a braking member and adapted to be moved axially with respect to said speed responsive means and said friction member for determining any one of said predetermined speeds and in a direction with respect to said friction member tending to permit said speed responsive means to increase its speed, actuating means operatively connected to said control means and movable through a plurality of positions each corresponding to one of said predetermined speeds for moving said brake member with respect to said friction member to establish a predetermined speed, and operating means engaging the outermost convolution of the band on said drive shaft and operatively connected to said control means for pivoting said control means in a direction to vary the position of said braking member with respect to said friction member and to compensate for the change in torque of said drive shaft as the diameter of said band thereon decreases for maintaining the speed of said speed responsive means constant.

2. A speed control assembly for operation at a plurality of predetermined speeds comprising a speed responsive means having a plurality of weight members movable by centrifugal forces created therein, a friction member movable by said weight members to several positions each corresponding to the speed of said speed responsive means, a drive means including a resilient metallic band having the ends thereof fixed to spaced parallel shafts and adapted to be wound in a spiral from one of said shafts onto the other of said shafts, said other shaft being a drive shaft operatively connected to and driving said speed responsive means when said band is wound from said drive shaft onto said first-mentioned shaft, control means including a follower member and a braking member and mounted for axial and pivotal movement with respect to said speed responsive means and friction member, actuating means including a cam engaging said follower member and adapted to be rotated through a plurality of positions each corresponding to one of said predetermined speeds for moving said control means axially to position said braking member with respect to said friction member to establish a predetermined speed, and an operating member engaging the outermost convolution of the band on said drive shaft and operatively connected to said control means for movement as the band convolutions decrease to pivot said control member in a direction to vary the position of said brake member with respect to said friction member independently of said actuating means to maintain the predetermined speed of said speed responsive means constant as the torque of said drive shaft decreases.

3. A speed control assembly for operation at a plurality of predetermined speeds comprising a speed responsive means having a plurality of weight members movable by centrifugal forces created therein, a friction member movable by said weight members to several positions each corresponding to the speed of said speed responsive means, a drive means including a resilient metallic band having the ends thereof fixed to spaced parallel shafts and adapted to be wound in a spiral from one of said shafts onto the other of said shafts, said other shaft being a drive shaft operatively connected to and driving said speed responsive means when said band is wound from said drive shaft onto said first-mentioned shaft, control means including a follower member and a braking member and mounted for axial and pivotal movement with respect to said speed responsive means and friction member, actuating means including a cam engaging said follower member and adapted to be rotated through a plurality of positions each corresponding to one of said predetermined speeds for moving said control means axially to position said braking member with respect to said friction member to establish a predetermined speed, and an operating lever having one end in engagement with the outermost convolution of the band on said drive shaft and the other end operatively connected to said control means and pivotally mounted between said ends for movement as the band convolutions decrease to pivot said control means in a direction to vary the position of said brake member with respect to said friction member independently of said actuating means to maintain the pre&. determined speed of said speed responsive means as the torque of said drive shaft decreases.

4. A speed control assembly for operation at a plurality of predetermined speeds comprising a speed responsive means having a plurality of weight members movable by centrifugal forces created therein, a friction member movable by said weight members to several positions each corresponding to the speed of said speed responsive means, a drive means including a resilient metallic band having the ends thereof fixed to spaced parallel shafts and adapted to be wound in a spiral from one of said shafts onto the other of said shafts, said other shaft being a drive shaft operatively connected to and driving said speed responsive means when said band is wound from said drive shaft onto said first-mentioned shaft, control means including a follower member and a braking member and mounted for axial and pivotal movement with respect to said speed responsive means and friction member, actuating means including a cam engaging said follower member and adapted to be rotated through a plurality of positions each corresponding to one of said predetermined speeds for moving said control means axially to position said braking member with respect to said friction member to establish a predetermined speed, and an operating member engaging the outermost convolution of the band on said drive shaft and operatively connected to said control means for movement as the band convolutions decrease to pivot said control member in a direction to vary the position of said brake member with respect to said friction member independently of said actuating means to maintain the predetermined speed of said speed responsive means as the torque of said drive shaft decreases, and resilient means engaging said control means for maintaining said follower member in engagement with said cam and said operating means in engagement with the convolutions of said band and for biasing said control means in a direction to permit said axial and pivotal movement thereof.

5. A speed control assembly for operation at a plurality of predetermined speeds comprising a speed responsive means having a plurality of weight members movable by centrifugal force created therein, a friction member movable by said weight members to several positions each corresponding to the speed of said speed responsive means, a drive means including a resilient metallic band having the ends thereof fixed to spaced parallel shafts and adapted to be wound in a spiral from one of said shafts onto the other of said shafts, said other shaft being a drive shaft operatively connected to and driving said speed responsive means when said band is wound from said drive shaft onto said first-mentioned shaft, control means including a follower member and a braking member and mounted for axial and pivotal movement with respect to said speed responsive means and friction member, actuating means including a cam engaging said follower member and adapted to be rotated through a plurality of positions each corresponding to one of said predetermined speeds for moving said control means axially to position said braking member with respect to said friction member to establish a predetermined speed, and an operating lever having one end in engagement with the outermost convolution of the band on said drive shaft and the other end operatively connected to said control means and pivotally mounted between said ends for movement as the band convolutions decrease to pivot said control means in a direction to vary the position of said brake member with respect to said friction member independently of said actuating means as the torque of said drive shaft decreases, and resilient means engaging said control means between the mounting point thereof and the point of engagement of said cam and follower member for biasing said control means in a direction to maintain the engagement of said cam and follower member and said lever in engagement with the convolutions of said band and to permit said axial and pivotal movement of said control means.

References Cited in the file of this patent

UNITED STATES PATENTS

| | | |
|---|---|---|
| 2,063,799 | Fornelius | Dec. 8, 1936 |
| 2,180,005 | Gunnarson | Nov. 14, 1939 |